United States Patent [19]

Duncan

[11] Patent Number: 4,731,252

[45] Date of Patent: Mar. 15, 1988

[54] HAMBURGER COOKER AND METHOD OF COOKING HAMBURGERS

[76] Inventor: William D. Duncan, P.O. Box 9225, Fort Myers, Fla. 33902

[21] Appl. No.: 921,382

[22] Filed: Oct. 22, 1986

[51] Int. Cl.⁴ .......................... A23L 1/01; A47J 37/04
[52] U.S. Cl. ..................................... 426/523; 99/426; 99/446
[58] Field of Search .................. 426/523, 513; 99/426, 99/440, 446, 449, 372, 374, 375

[56] References Cited

U.S. PATENT DOCUMENTS

| | | | |
|---|---|---|---|
| 3,045,277 | 7/1962 | Carpenter | 426/513 |
| 3,719,507 | 3/1973 | Bardeau | 99/446 |
| 4,512,250 | 4/1985 | Schindler et al. | 426/523 |
| 4,662,273 | 5/1987 | Marchioni | 99/426 |

Primary Examiner—George Yeung
Attorney, Agent, or Firm—Alfred E. Wilson

[57] ABSTRACT

A broiler plate assembly is disclosed wherein a broiler plate having a plurality of spaced patty molds is provided. The bottom of each of the patty molds is formed with intersecting grease drains to permit the escape of liquified grease to a grease pan during the cooking operation. After the hamburger patties have been cooked for a desired time, a flat plate is slid into place on the broiler plate to close the molds to permit inverting the broiler plate to release the cooked hamburger patties from the patty molds.

5 Claims, 6 Drawing Figures

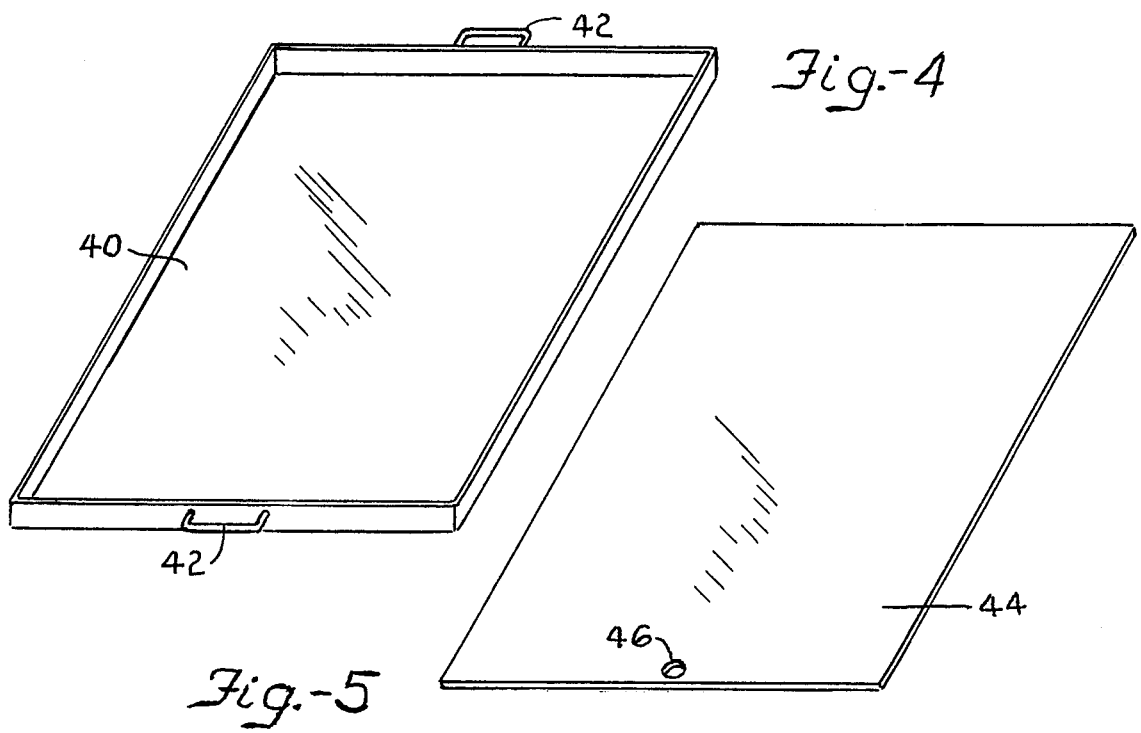
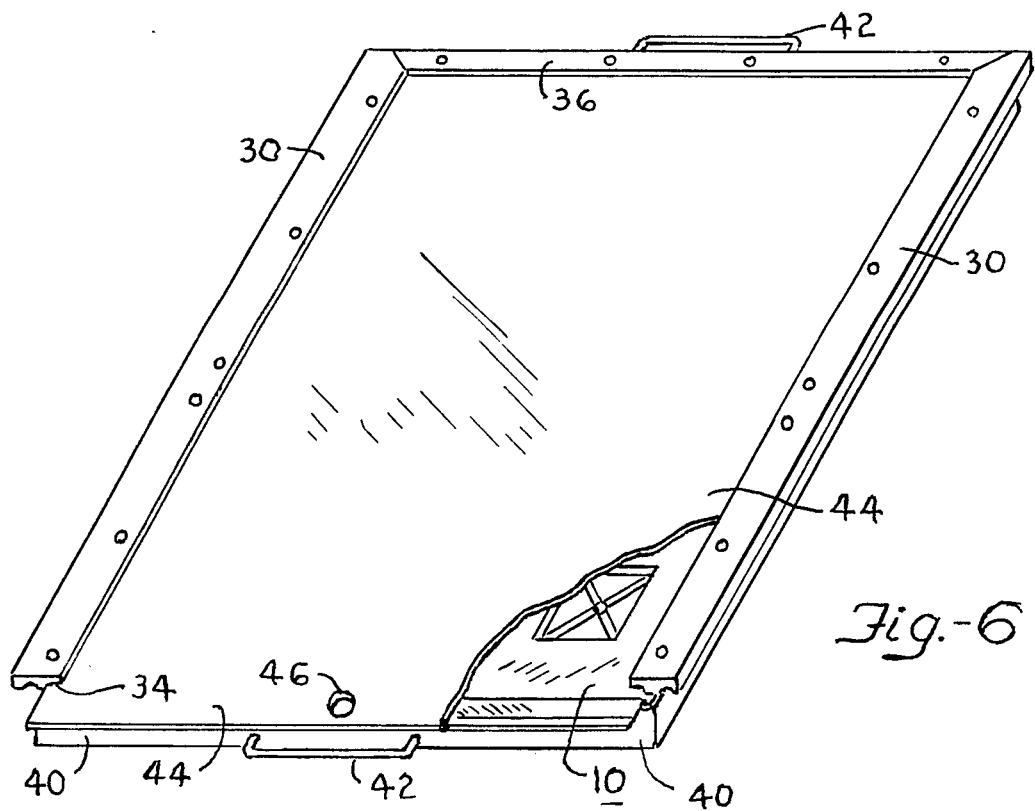

HAMBURGER COOKER AND METHOD OF COOKING HAMBURGERS

BACKGROUND OF THE INVENTION

Hamburgers which in their inseption were intended to provide an economical snack have gotten so big and so expensive that their operators now compete with restaurants serving full course meals.

As a result there is now a large need for a small hamburger which can be produced in large quantities to supply a substantial demand, and at a very economical pricing.

The cost of equipment to operate a hamburger sales organization has also gotten so expensive that only large well financed organizations can now enter the field. The old time "Mom and Pop" type of organization has long since been forced out of the business.

DESCRIPTION OF THE PRIOR ART

The hamburger business, which used to provide a place where a person could purchase a light lunch for very reasonable prices has virtually passed out of existance in recent years. Now the so-called fast food business has gotten into the hands of a half dozen or less large well financed franchisors who serve a wide variety of foods and who complete with the well organized restaurants.

The advent of the small well organized hamburger sales organization which were economically priced and well managed to provide good food has virtually passed out of existance. It appears that there is now a need for a recurrance of good haamburgers which can be purchased for very reasonable prices and which provide good quality.

SUMMARY OF THE INVENTION

Applicant's improved Broiler Plate System embodies a plurality of rows of individual patty molds providing a plurality of substantially uniform predetermined rectangular shaped molds to insure substantially uniform cooking of all of the patties. An important facit is that the excess grease and oils are rapidly dispensed as soon as they are heated to liquify them to such a degree that they will flow out of the bottom of each of the pattie molds to provide a hamburger that is substantially free from excess grease or oils.

The Broiler Plate can be loaded quickly by placing a preportioned package of processed beef on the Broiler Plate and using tooling to fill all of the patty molds. The Broiler Plate is then positioned on a grease pan and placed in a broiler or in a convection oven. The oven operates at high temperatures to insure cooking the hamburgers quickly. The assembly consisting of the Broiler Plate and the grease pan may then be removed from the oven, and be placed on a work table. A stainless steel cover is then slipped into the grooves on top of the Broiler Plate, and the Broiler Plate is removed from the grease pan and is placed upside down on a hot grill. The stainless steel cover is then withdrawn. The individual cooked patties will then drop down on a heated grill. The Broiler Plate is then removed and the individual cooked patties are assembled with buns to prepare hamburgers, or the individual patties are placed in packages and bagged for future use.

BRIEF DESCRIPTION OF THE DRAWINGS

FIG. 4 is a perspective view showing the grease pan in which the broiler plate is positioned during the cooking process.

FIG. 5 is a perspective view of the steel sheet to be positioned in the grooves shown in FIGS. 1 to 3 during the extraction of the hamburgers from the broiler plate.

FIG. 6 is a perspective view showing all of the special equipment used in cooking the hamburgers.

DESCRIPTION OF THE PREFERRED EMBODIMENT

Figure 1:
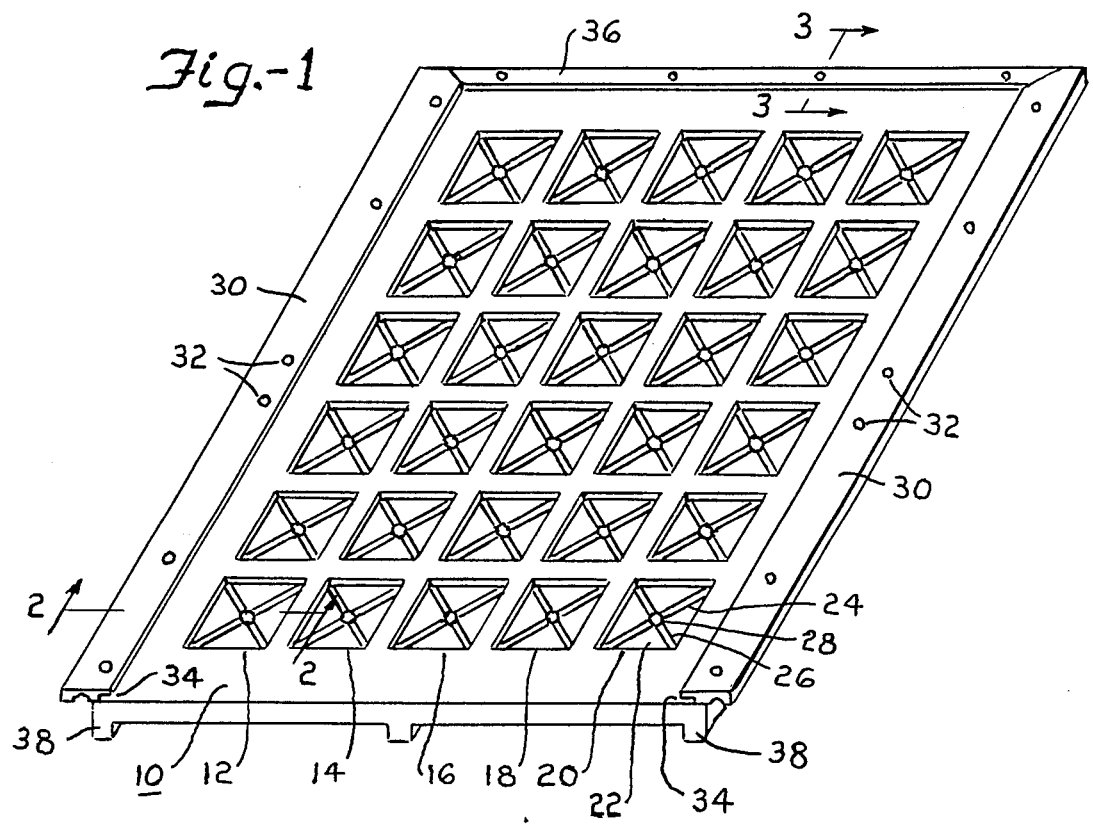
FIG. 1 is a perspective view of the broiler plate having the patty molds therein.
Figure 2:
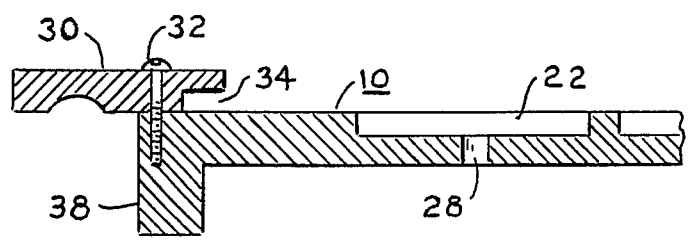
FIG. 2 is a fragmentary sectional view of a portion of the broiler plate taken substantially on the line 2—2 of FIG. 1, looking in the direction of the arrows.
Figure 3:
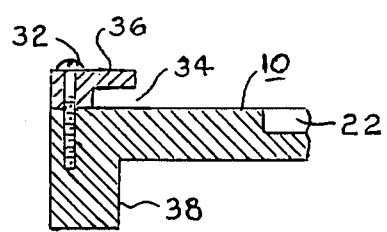
FIG. 3 is a view similar to FIG. 2, taken on the line 3—3 of FIG. 1, looking in the direction of the arrows.

Referring now to FIG. 1, a Broiler Plate 10, having for example five rows of hamburger patty molds 12, 14, 16, 18 and 20. Each row has for example six patty molds so that a total of thirty hamburgers are cooked in the patty molds 22 in the plate 10. It will of course be understood that a lesser or a greater number of patty molds 22 may be provided in the Broiler Plate 10, and that if desired the proportions of the patty molds may be varied to provide hamburgers that are larger or smaller than those illustrated.

The Broiler plate 10 may for example be formed of cast aluminum having the patty molds 22 therein, it being understood that any other type of material may be used if desired to form the Broiler Plate 10. The upper surface of the Broiler Plate is milled or otherwise processed to provide a smooth top surface. In the example illustrated each of the patty molds 22 is approximately $2\frac{3}{4}''$ square and the meat well provided in each of the patty molds 22 is approximately $\frac{1}{4}''$ deep.

As illustrated in FIG. 1 the bottom of each of the patty molds 22 is formed with intersecting grease drains 24 and 26 that are for example approximately $\frac{1}{4}''$ wide and approximately $\frac{1}{8}''$ deep. These grease drains can conveniently be formed by a routing process, although it will be understood that any other process may be used if desired. An aperture 28 at the intersection of the grease drains 24 and 26 is provided to permit the escape of liquified grease from the hamburgers being cooked in each of the patty molds 22.

The sides of the Broiler Plate 10 is provided with side bars 30 secured to the sides of the Broiler Plate 10 in any convenient manner as by a plurality of bolts 32. The side bars 30 provide undercut grooves 34 on opposite sides of the Broiler Plate 10 and at the back as illustrated in FIG. 1. The bottoms of the side bars 30 are undercut to provide convenient hand grips on opposite sides of the Broiler Plate 10 to assist in moving the Broiler Plate as hereinafter described. An end bar 36 is provided to close the back end of the Broiler Plate 10. It will be noted that the groove 34 is provided in alignment with the grooves in the side bars.

The Broiler Plate 10 has a plurality of short legs 38 whereby the Broiler Plate 10 can be positioned on a table while the patty molds 22 are being filled with hamburger beef or other meat products.

To load the Broiler Plate 10 a pre-portioned package of beef, by weight, or other meat product can be placed on the Broiler Plate 10 and it can be uniformly and quickly spread by the use of a roller or a spatula to insure filling all of the patty molds 22 flush with the top of the Broiler Plate 10.

When the patty molds 22 are all filled with hamburger or other meat product the Broiler Plate 10 is picked up, using the undercut grooves 34 formed in the underside of the side bars 30 to assist in moving the plate 10, and it is placed in the grease pan 40 illustrated in FIG. 4. It will be noted that the legs 38 which support the Broiler Plate 10 fit within the grease pans to elevate the Broiler Plate 10 so that the grease aperture 28 in each of the patty molds 22 is raised well above the bottom of the pan 40 to permit the escape of excess grease from the hamburgers being cooked in the patty molds 22.

The Broiler Plates 10 are preportioned so that they can be utilized under a broiler or in a convenction oven, such for example as is used in a Pizza oven which operates at high temperatures to broil or otherwise cook beef or hamburger patties or other meat products. It will be noted that the overall size of the system will permit the use of two broiler plates 10 at the same time in a standard 48" Pizza or other oven.

Attention is directed to the fact that if two Broiler Plates are used simultaneously in a 48" oven, such for example as in a Pizza oven which operates at high temperatures, ranging up to approximately 500° F., sixty hamburgers can be cooked simultaneously in approximately 5 minutes. Each of the hamburgers will be of uniform size, approximately 2½" square after shrinkage due to cooking, thickness approximately ¼" and substantially equal weight. Pre-packaged portions of beef or other meat products packaged by weight can be prepared in advance to permit rapid operation, and assuring uniformity of product. Attention is directed to the fact that the hamburgers are broiled rather than being fried, and that the hamburgers will not be greasy because a lot of the grease will have escaped to the grease pan.

In the cooking and preparing process, the Broiler Plate loaded with hamburger or other meat products is lifted by the side bars 30 and is placed in the grease pan 40. The grease pan is then grasped by the front and rear handles 42 and is positioned in the oven. The hamburger patties in the molds 22 remain uncovered during the cooking process. After a relatively short period of time, such for example as 5 or 6 minutes at an oven temperature of 475° F. to 500° F., the hamburgers are broiled and the excess grease or fat will have drained out through the drains 24 and 26 to the apertures 28 in each patty mold 22.

After the hamburgers have been cooked for the desired time, the grease pan 40 with the Broiler Plate 10 in place therein and with the cooked hamburgers in place in the patty molds 22 are removed from the oven, and the assembly is placed on a work table that preferably is made of metal to withstand the heat.

A flat steel plate 44, preferably made of stainless steel, is then slid into place on the Broiler Plate 10, the outer edges of the plate 44 sliding into the grooves 34 formed by the inner edges of the side bars 30, and the rear bar 36. The inward movement of the plate 44 is stopped by the end bar 36 at the inner end of the Broiler Plate 10.

After having been removed from the oven the Broiler Plate 10 with the hamburgers in place therein are grasped by the side bars 30, the grooves 34 therein assisting in the manipulation of the Broiler Plate 10, and the entire assembly is turned upside down and it is placed on a heated grill. The steel plate 44 which held the cooked hamburgers in the patty molds 22 is then removed by projecting any suitable instrument in the hole 46 in the plate 44 and pulling the plate out to permit the cooked hamburgers to fall out of the patty molds 22 onto the grill. The hamburgers can then be assembled with buns for immediate sale, or they can be placed in individual packages for subsequent sale.

All of the components of the Broiler Plate system are illustrated in an assembled relation in FIG. 6. The Broiler Plate 10 having the patty molds 22 therein, and having the side bars 30 secured thereon are positioned in the grease pan 40 preparatory to being placed in the oven, after the patty molds 22 have been filled with hamburger or other meat product.

After the cooking operaton is complete, the assembly consisting of the grease pan 40 and the Broiler Plate 30 filled with the meat product is removed from the cooking oven. The steel plate 44 is then inserted in the grooves 34 formed between the inner edges of the side bars 30 and the Broiler Plate 10 to hold the hamburgers in the patty molds 22 when the assembly consisting of the Broiler Plate 10 and the steel plate 44 is inverted to release the cooked hamburgers from the molds. The steel plate 44 is then withdrawn to release the cooked hamburgers which drop to the grill top on which the Broiler Plate is inverted. The Broiler Plate 10 is then lifted to leave the cooked hamburgers lying ready for assembly with buns or other food products.

Attention is directed to the fact that the plate 44 is only used for a few minutes during the processing of each batch of hamburgers that are cooked. That is during the time that the plate 44 is inserted on top of the Broiler Plate 10 to hold the cooked hamburgers in place in the patty molds while the Broiler Plate 10 is lifted off of the grease pan 40 and is inverted on the grill or elsewhere. The plate 44 is then removed from the Broiler Plate 10 to release the cooked hamburgers from the patty molds 22 whereupon the broiler grill is lifted off of the cooked hamburgers, and the hamburgers can be assembled with buns or packaged for later use.

I claim:

1. A hamburger cooker comprising a broiler plate having a smooth upper surface, and a plurality of patty molds each having a meat well having an upper surface aligned with the upper surface of the broiler plate, each patty mold having an aperture to permit the escape of liquified grease to a grease pan during the cooking operation, and means including a flat plate aligned with the upper surface of the broiler plate to close the meat wells to confine the hamburgers in the patty molds to permit inverting the broiler plate to release the hamburgers from the patty molds.

2. The hamburger cooker defined in claim 1 wherein spaced grooves are formed on opposite sides of the broiler plate, and a plate is slidably mounted in the spaced grooves to close the meat wells of the patty molds to permit inverting the broiler plate, and removing the plate to permit removal of the broiler plate to release the hamburgers.

3. The hamburger cooker defined in claim 1 wherein a plurality of columns of patty molds are employed and a plurality of ranks of patty molds are provided.

4. The hamburger cooker defined in claim 3 wherein five columns of patty molds are employed and six ranks of patty molds are employed.

5. A method of cooking hamburgers which comprises the steps of (1) providing a broiler plate having a smooth upper surface, and having a plurality of spaced meat wells each having an upper surface aligned with the smooth upper surface of the broiler plate, a grease escape aperture in each of the meat wells to permit the escape of liquified grease from each of the meat wells during the cooking process; (2) loading hamburger patties on the broiler plate and filling the meat wells to the top of the broiler plate with the hamburger patties; (3) (6) placing the broiler plate with the meat wells filled with the hamburger patties in a grease pan; (4) cooking the hamburger patties in the meat wells by heating the broiler plate and the patties; (5) covering the smooth upper surface of the broiler plate and the meat wells with a flat plate to form an assembly when the cooking operation is complete to permit inverting the broiler plate with the patties in place; (6) inverting the assembly; and (7) removing the flat plate to release the cooked hamburger patties from the meat wells of the broiler plate.

* * * * *